Dec. 31, 1929.  W. BALL  1,742,053
CALCULATING MACHINE, CASH REGISTER, AND THE LIKE
Filed Aug. 24, 1925  5 Sheets-Sheet 1
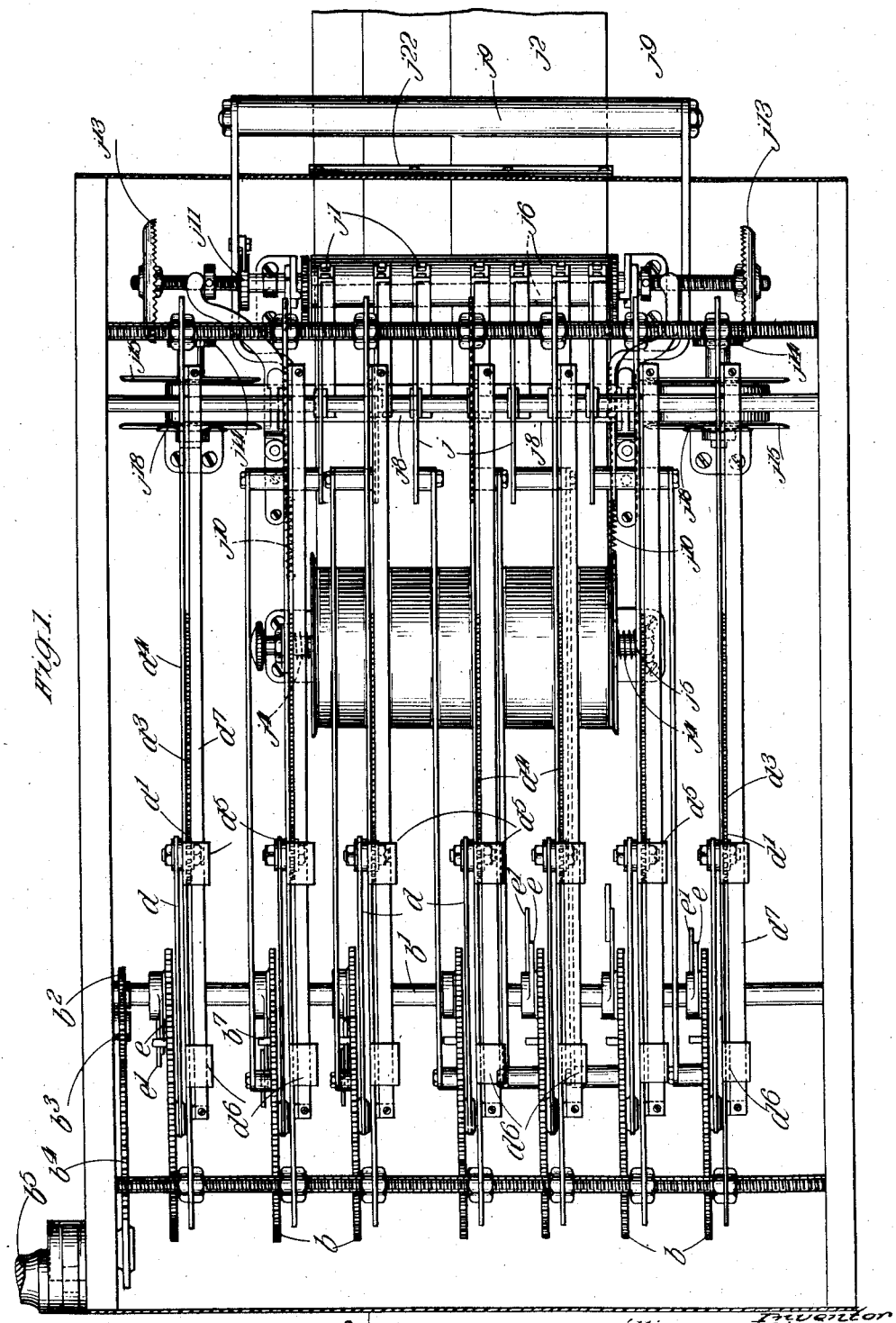

Dec. 31, 1929. W. BALL 1,742,053
CALCULATING MACHINE, CASH REGISTER, AND THE LIKE
Filed Aug. 24, 1925 5 Sheets-Sheet 2
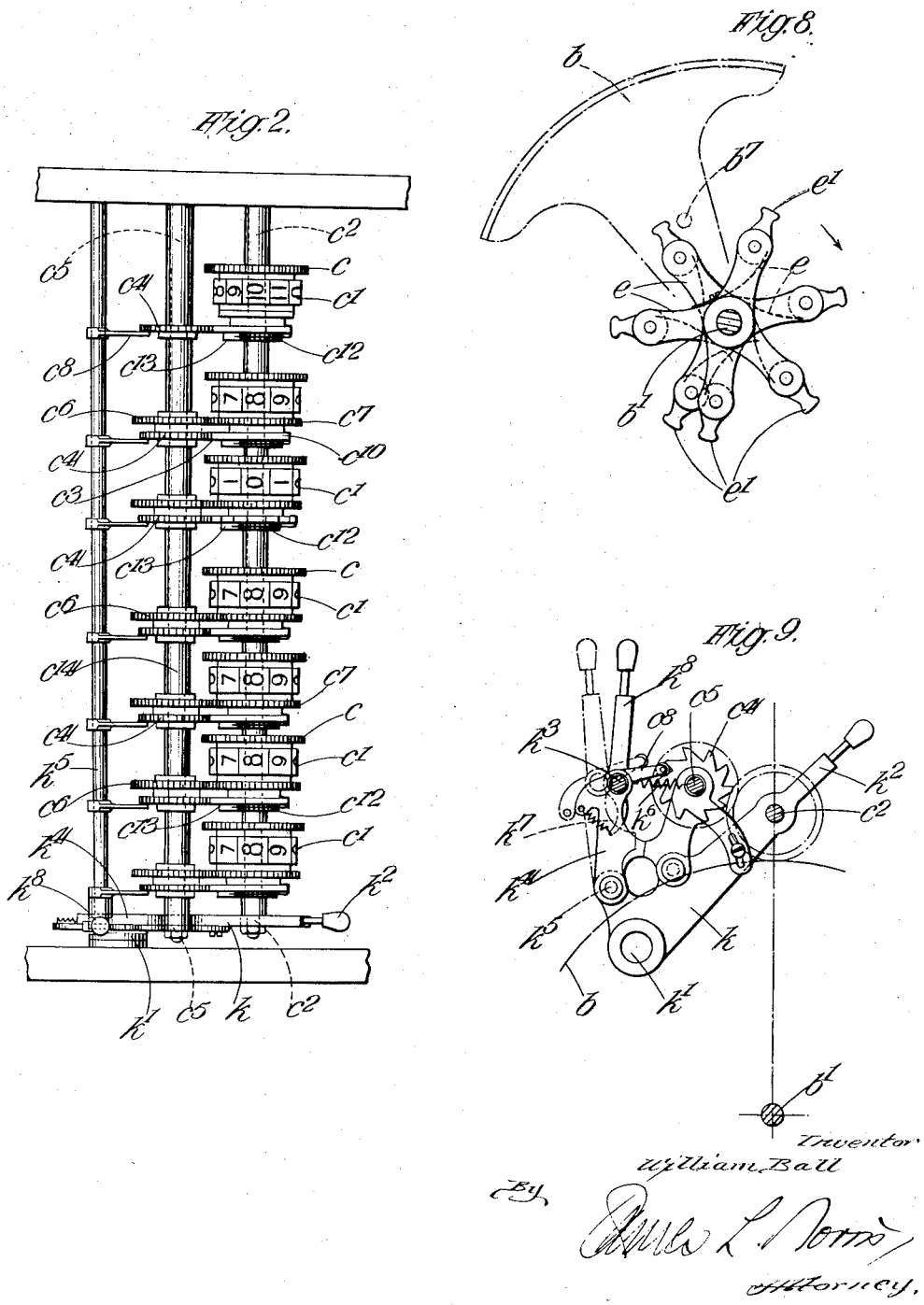
Inventor
William Ball

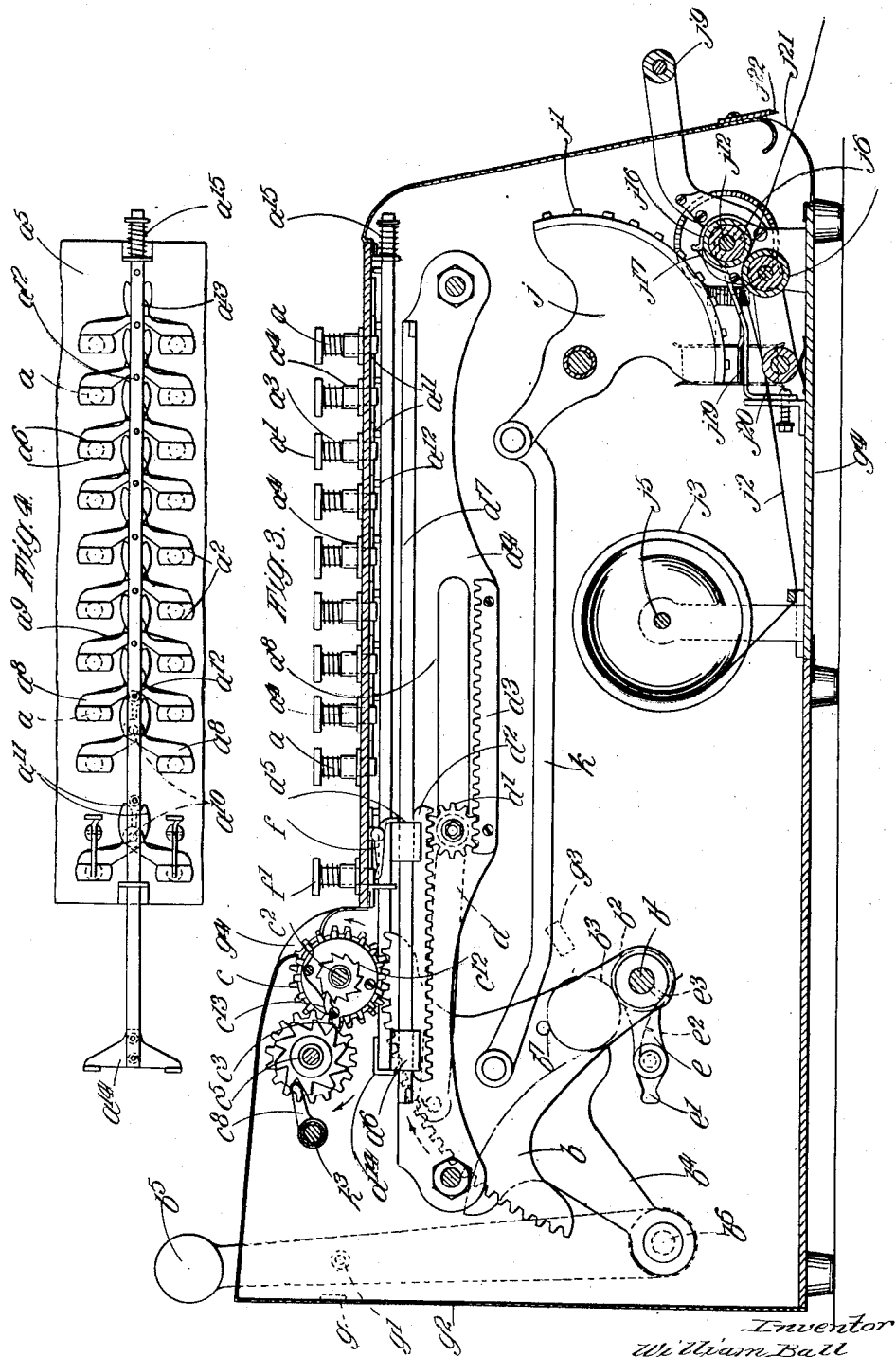

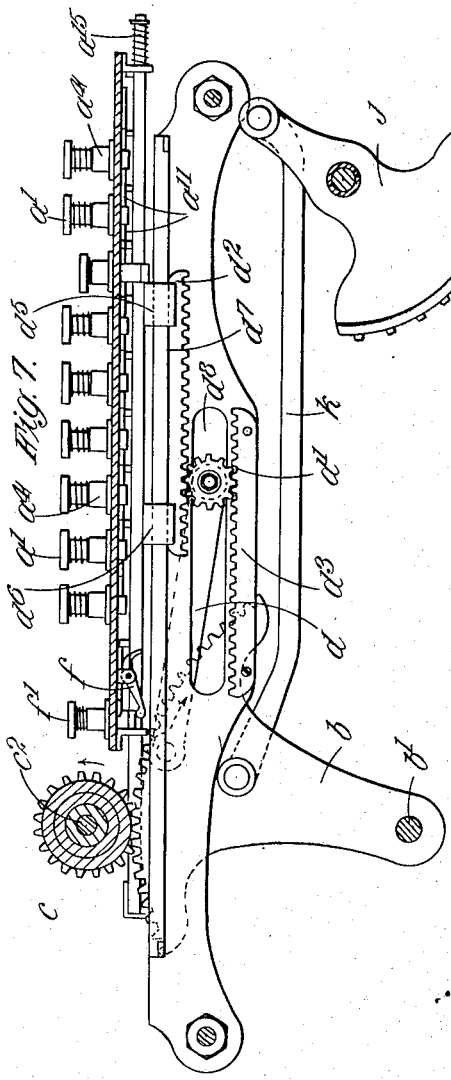
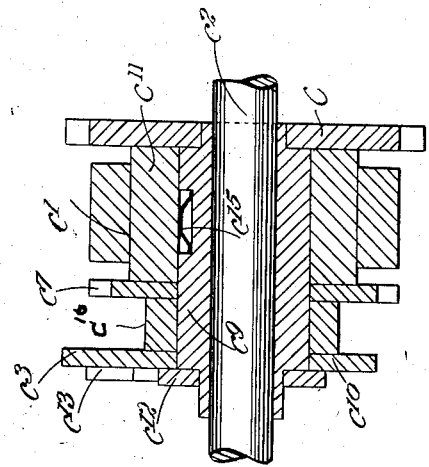
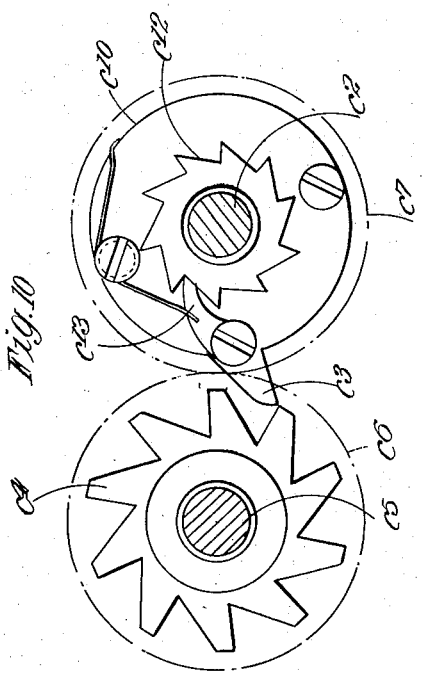
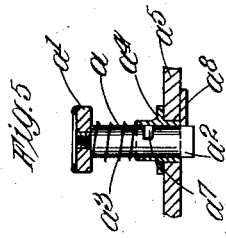
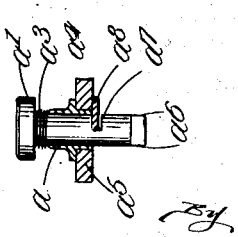

Dec. 31, 1929.   W. BALL   1,742,053
CALCULATING MACHINE, CASH REGISTER, AND THE LIKE
Filed Aug. 24, 1925   5 Sheets-Sheet 5
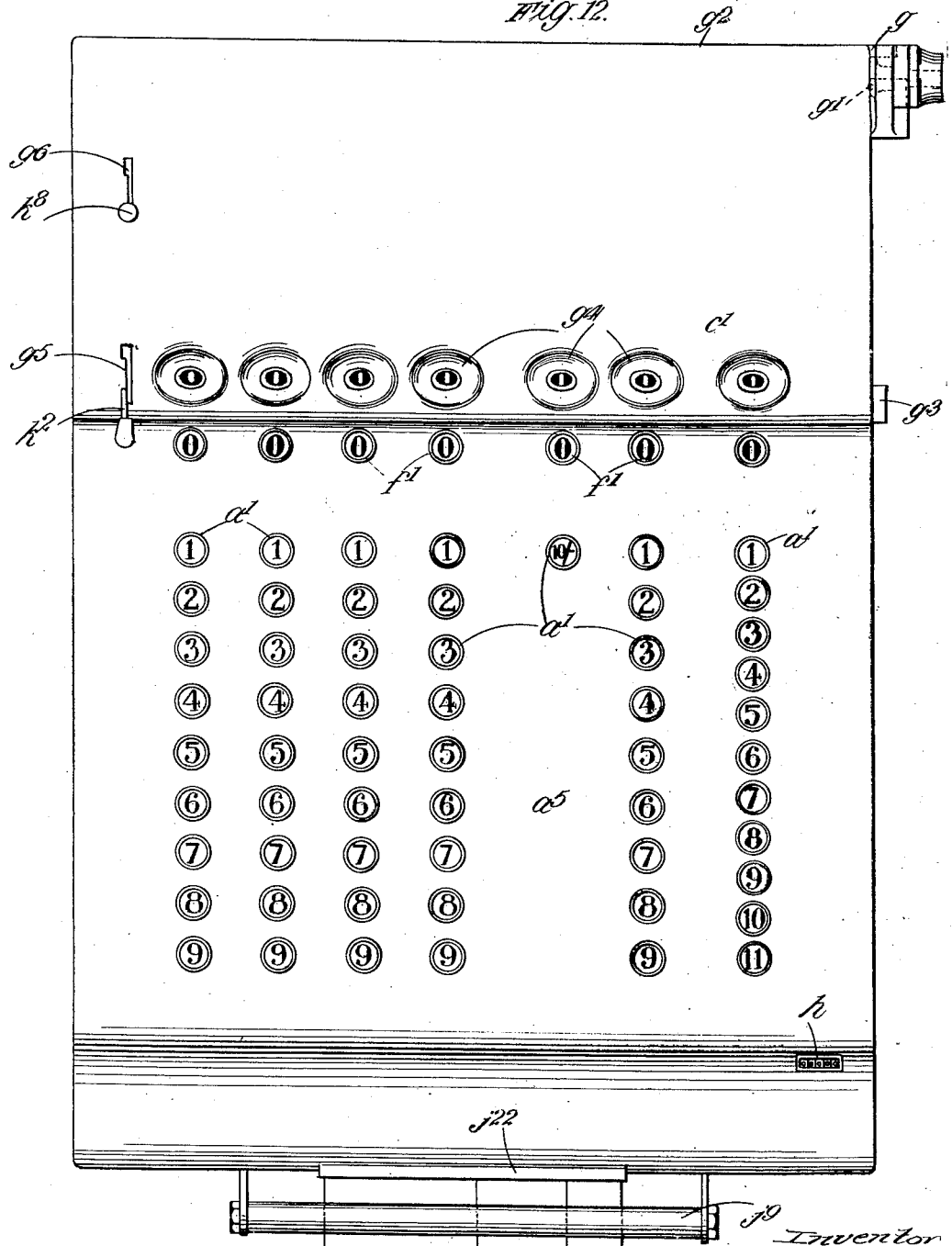

Patented Dec. 31, 1929

1,742,053

UNITED STATES PATENT OFFICE

WILLIAM BALL, OF WALLINGTON, ENGLAND

CALCULATING MACHINE, CASH REGISTER, AND THE LIKE

Application filed August 24, 1925, Serial No. 52,104, and in Great Britain September 5, 1924.

This invention relates to improvements in calculating machines, cash registers and the like, and has for its chief objects the simplification in construction and working of the counting mechanism; improved means for operating the counting mechanism whereby the keys are enabled to be well separated so as to facilitate their manipulation by the operator; and generally to simplify and cheapen the cost of production of the machine.

In the drawings,

Figure 1 is a plan of the machine with the key board and counting units removed.

Figure 2 is a plan of the counting units.

Figure 3 is a vertical section from front to back of the machine and shows the mechanism in the non-counting position.

Figure 4 is an underplan of a portion of the key board and shows means for maintaining the keys in the depressed or operative position and for clearing the key board.

Figures 5 and 6 are fragmentary views on an enlarged scale showing a key in the raised and depressed positions respectively.

Figure 7 is a view similar in part to Figure 3 and shows a portion of the mechanism in a counting position.

Figure 8 is an end elevation of pick-up mechanism for operating the quadrants by which the counting units are in turn operated.

Figure 9 is an end elevation of mechanism for enabling the counting units to be returned to zero.

Figure 10 is an end elevation, on an enlarged scale, of one of the counting units.

Figure 11 is a longitudinal section, also on an enlarged scale, of one of the counting units, and Figure 12 is a plan of the complete machine.

Like letters refer to like parts throughout the drawings.

Dealing first with the keys, these as shown in Figs. 5 and 6 consist of plungers $a$, each having an operating knob $a^1$ at its upper end and a head $a^2$ at the lower end, and they are kept normally raised by means of compression springs $a^3$ arranged between the knobs and bushings $a^4$ on the key board $a^5$. The heads $a^2$ have flattened portions $a^6$ and the shanks are slotted as at $a^7$. The flattened portions $a^6$ are engaged by stops $a^8$ controlled by springs $a^9$ (Fig. 4) which prevent the keys turning, and when the keys are depressed, the said stops $a^8$ snap into the slots $a^7$ and hold the keys down while the total rollers (hereinafter referred to) are turned, and then the stops are withdrawn from the slots in order to permit of the return of the keys to their raised position. The said stops are arranged in rows of pairs, each row being adapted to operate on two rows of keys simultaneously by reason of the fact that each pair of stops are pivoted together at $a^{10}$ in scissors fashion and have their free ends $a^{11}$ divergent so that pins $a^{12}$ arranged on a longitudinal movable clearing bar $a^{13}$ can be moved to enter between and to force said free ends apart and thereby withdraw the other ends of the stops from the said slots, whereupon the keys rise to the normal position, due to the pressure of the springs $a^3$.

The mechanism for operating the total rollers comprises arms in the form of toothed quadrants $b$ mounted freely on an operating shaft $b^1$ which is geared, by means of toothed wheels $b^2$ and $b^3$ and toothed quadrant $b^4$, to an operating handle $b^5$ mounted on a pin $b^6$ at the rear of the machine. The quadrants $b$ are geared with toothed wheels $c$ fixed on the total rollers $c^1$ (Fig. 2) and are connected by links $d$ to pinions $d^1$ which run between upper racks $d^2$, which are movable endways, and lower racks $d^3$, which are fixed on stretchers $d^4$. The upper racks are provided with front and rear abutments $d^5$ and $d^6$, respectively, which slide on guide rods $d^7$ fixed to the stretchers $d^4$. The pinion spindle is provided with a roller which works along the slots $d^8$ in the stretchers $d^4$ so as to prevent jamming between the teeth of the pinion and the racks. The front abutments $d^5$ are moved into engagement with the depressed keys by means of the pinions when the operating handle is turned, as will be presently described.

By means of the above described arrangement of double rack and pinion the travel of the abutments is twice that of the toothed quadrants $b$; thereby enabling a long key board to be employed with consequent ease of manipulation of the keys by the operator.

The toothed quadrants $b$ are operated as follows. Fixed to the operating shaft $b^1$ is a series of spring-controlled pick-up or driving arms $e$ spaced part (as shown more clearly in Figure 8) their outer ends being provided with pivoted noses $e^1$ which are controlled by springs $e^2$, the latter being secured at one end to the noses and being slotted at the other end so that they can slide under the heads of screws $e^3$ in the bosses of the pick-up arms.

When the keys, corresponding to an amount or number to be added, are depressed, the operating handle is pulled forward (to the right in Fig. 3) thereby causing the said noses $e^1$ to press against pins $b^7$ on the quadrants $b$, and rock the latter until the abutments $d^5$ on the corresponding racks $d^2$ engage the shanks of the depressed keys (see Figure 7). When the motion of each quadrant is thus arrested the continued pull on the operating handle causes the noses to slip past, and move to the opposite side of, the pins $b^7$, so as to enable the operating handle to complete its movement and cause all the depressed keys to be engaged by the corresponding abutments. The return of the operating handle causes the noses $e^1$ to return the quadrants $b$ and then slip past the pins $b^7$ to their former position ready for action again. The pick-up arms $e$ set a short distance beyond the zero position of the toothed quadrants $b$ thereby allowing a short idle movement of the pick-up arms before they engage the pins $b^7$ on the quadrants when the operating handle is operated.

In order to provide for cases where no key is depressed in any particular row of keys and, therefore, no item is to be added for that row, each row of keys has a spring-controlled trip-lever $f$ (Figs. 3 and 7), one end of which engages the front abutment $d^5$ and the other end of which engages a release key $f^1$, which is controlled in the same way as the remaining or figure keys. Thus, in the cases referred to, the trip-lever prevents movement of the rack, and therefore of the corresponding total roller, but when a figure key is to be depressed to show an item on the roller, the release key is depressed so as to free the trip-lever from the abutment, whereupon the rack carrying the abutment is free to advance.

The clearing bars $a^{13}$ are provided at their inner ends with a plate $a^{14}$ which is engaged by the rear abutments $d^6$ on the upper racks when the toothed quadrants are returned. The operating handle is pushed slightly beyond the zero position against a stop $g$ so as to cause the pins $a^{12}$ on the clearing bars to act on the ends $a^{11}$ of the stops $a^8$ and release the latter from the keys thereby allowing the keys to return to their normal position and the trip-levers to come into position ready to engage the front abutments. The operating handle is then returned to the zero position, being temporarily held in that position by a spring-pressed ball $g^1$ mounted in the casing $g^2$ of the machine and which enters a depression in said handle. The return of the handle results in the clearing bars advancing slightly due to the pressure of springs $a^{15}$ mounted thereon, thereby releasing the pins $a^{12}$ from the ends $a^{11}$ of the stops so as to leave the latter free to engage the slots in the keys at the next operation of the keys. The front end of one of the clearing bars is arranged to operate a counting device $h$ (Figure 12) each time it advances so as to check the number of items recorded. Alternatively, the counting device may be actuated by the operating handle, or other suitable working part of the machine.

The total rollers are mounted on a shaft $c^2$, and each of them, excepting the last one, is provided with a striking-arm $c^3$ (shown more clearly in Figure 10) so that as each roller, excepting the last, completes a revolution, the outer end of its striking arm strikes an impulse wheel $c^4$ at one end of a bush on a parallel shaft $c^5$, a toothed wheel $c^6$ at the other end of the bush transferring the motion to a toothed wheel $c^7$, of the same size and pitch, on the total roller of the next higher denomination. The total rollers are prevented from moving backward when the operating handle is returned to normal position by means of pawls $c^8$ which engage the impulse wheels $c^4$.

A convenient way of building up the counting units is shown in Figure 11, in which $c^9$ is a sleeve, to one end of which is fixed the driving wheel $c$, which meshes with its quadrant $b$. A slot is cut lengthwise of the sleeve to receive a bow-spring $c^{15}$. A bush $c^{11}$ takes over the sleeve and is held friction-tight thereon by means of the bow-spring. The figure-band $c^1$ is suitably numbered on its outer periphery and is arranged friction-tight around the bush so that the position of the band relatively to the bush may be varied for the purpose of adjusting the unit in the first place. The small bush $c^{16}$ remote from the driving wheel is reduced and between it and the inner end of the bush $c^{11}$ is fixed the toothed transfer wheel $c^7$. To the outer end of the reduced bush $c^{16}$ is fixed a disc $c^{10}$ provided with the striking arm $c^3$, the arrangement and the use of which are hereinafter described.

On the sleeve on the outside of the disc is fixed a ratchet wheel $c^{12}$ co-acting with a pawl $c^{13}$ fixed to the disc, the said pawl being controlled by a spring, so that the bush, together with its associated parts, is free to revolve on the sleeve in one direction due to the pawl slipping over the ratchet teeth, while it can only rotate with the sleeve in the opposite direction.

The numbering on the band around the bush is arranged to suit the position in which the roller is to be used. Thus, the pounds rollers and the second shillings bands are numbered 0—9 from the front to the back passing underneath the rollers, the first shillings band is numbered 0—1, 0—1 five times and the pence band is numbered 0—11. The farthings band, if used, would be marked 0, ¼, ½, ¾ three times and would operate in a similar manner to the first shillings band, as hereinafter described.

In the counting unit for the first column of shillings, i. e., tens of shillings, the disc is provided with five striking arms or projections equally spaced around the periphery thereof.

The required series of counting units is mounted loosely on the shaft carried by the brackets as hereinafter described and above it is arranged the rod which carries the impulse member.

Each impulse member comprises a sleeve $c^{14}$ of suitable length to one end of which is fixed the impulse wheel $c^6$, and to the other end of which is fixed the impulse ratchet $c^4$. The impulse ratchet $c^4$ is provided with ten teeth. Each impulse member is free on the shaft $c^5$ and the number of impulse members is one less than the number of counting units.

The distance between the two shafts $c^2$ and $c^5$ and the sizes of the various wheels are so arranged that the impulse ratchet $c^4$ is operated by the striking arm $c^3$ and so that the impulse wheel gears with the transfer wheel of the counting unit to the left of the counting unit the striker arm of which is adapted to engage the impulse ratchet.

The operation of the machine is as follows; the driving wheel of the counting unit is revolved by the movement of its quadrant and carries with it its associated parts due to the pawl taking against the ratchet on the sleeve, and so will cause the number corresponding to the key depressed to appear before the opening in the casing. On the return of the quadrants $b$ the driving wheel will be rotated and the bush etc. will remain stationary, the pawl slipping over the teeth of the ratchet, and the check pawls on the impulse members effectively preventing any backward rotation of the numbered band.

The numbered band on the bush and the striker arm on the disc are so arranged that when the number in front of the opening in the casing changes from 9 to 0, the striker arm engages the impulse ratchet and moves it forward one tooth before it moves out of the path thereof. This movement, equal to one tenth of a revolution, is imparted by the impulse member to the bush of the counting unit of the next higher denomination. The bush is free to rotate in the direction of addition, the pawl fixed to the disc thereon sliding over the teeth of the ratchet fixed to its sleeve. In this manner, at every rotation of a counting member a movement equivalent to one digit is transferred to the counting unit of the next higher denomination.

The counting unit which corresponds to the tens of shillings will transfer to the first pounds digit at every fifth of a revolution due to there being five striker arms provided on the disc attached thereto, because one complete revolution of this band will equal 100 shillings, i. e., £5, so that it is necessary to transfer five times in one revolution of this band.

If a band were provided for farthings it would be provided with three striker arms to transfer at every third of a revolution as will be readily understood.

Describing now the method of using the machine. Assume that the first item of those to be added is £1876. 15. 10. This sum is put on the total rollers in the following manner: Starting from the left-hand side of the machine, the 0 or release key is depressed and also the 1 key of the thousands of pounds column. These two keys may conveniently be depressed at one operation. The hundreds of pounds are then put on the key board by depressing the 0 and 8 keys of the hundreds of pounds. The rest of the figures are then put on the key board in a like manner, in each case depressing the 0 key as well as the key corresponding to the figure which it is desired to add. The operating handle $b^5$ is then pulled forwards, thus operating the quadrants $b$ through the pick-up arms $e$. The pick-up arms act in succession, starting from the pence end of the machine. Thus, when the first rack $d^2$ is stopped by the depressed key, the nose of the corresponding pick-up arm slips past the pin $b^7$ on the corresponding quadrant and continued rotation of the handle will cause the next pick-up arm to bring the shillings quadrant into action and so on, the noses slipping past the pins $b^7$ when the respective abutments on the upper racks abut against the depressed keys. When the handle has been turned through its full travel so as to engage the stop $g^3$, the amount £1876. 15. 10. will show in the openings $g^4$ in the casing and the handle may be returned to its original position, the driving wheel rotating backwards, due to the backward movement of the quadrants, and the bush $c^{11}$ remaining stationary on the sleeve $c^9$. The quadrants $b$ are provided at their front ends with blocked teeth to prevent them rotating too far backwardly.

The next item is then placed on the key board as above described and the handle operated. If the counting unit completes its rotation or part of rotation, as the case may be, it will transfer to the counting unit of the next higher denomination, as above described.

It will be obvious that machines according to this invention may be constructed to deal with decimal coinage and any other desired values or numbers.

The machine may be provided with any suitable devices to print the items. Conveniently, such devices consist of a series of type quadrants $j$ connected, by links $k$, to the toothed quadrants $b$, the type faces $j^1$ of the type quadrants corresponding to the figures on the total rollers with which they are in operative connection. The paper $j^2$ on which the items are to be printed is mounted on a spool $j^3$ which is pressed by springs $j^4$ at its ends so that it "floats" on its spindle $j^5$ and thereby becomes self-aligning with the rollers $j^6$ through which the printed paper is drawn. The inking ribbon $j^8$ runs above the paper, and in order to print the items the operator strikes and thereby depresses a striking plate $j^9$, controlled by springs $j^{10}$, thereby raising the paper and the ribbon up to the type quadrants for the items to be printed thereon. The return movement of the striking plate operates a ratchet $j^{11}$ on the spindle $j^{12}$ of the upper one of the feed rollers, which latter are geared together. This spindle is provided at its ends with toothed wheels $j^{13}$ engaging toothed wheels $j^{14}$ connected to the ribbon spools $j^{15}$, thereby advancing the ribbon and the paper. The upper feed roller $j^6$ is maintained in good frictional contact with the paper by means of bearing arms $j^{16}$ which are drawn down on to the said spindle by means of tension springs $j^{17}$. In order to prevent over-running of the ribbon on its spools, springs $j^{18}$ are arranged under compression between one side of the spools and their bearings whereby a drag is placed upon the spools. Reversal of the ribbon is effected automatically by providing it near each end with an enlargement which engages a fork $j^{19}$ pivoted on a bracket $j^{20}$ whereby the said spindle is disengaged from one of the spools and engaged with the other so as to reverse the direction of movement of the ribbon, the spindle being prevented from accidentally moving endways by means of a spring-loaded ball taking into a depression in the spindle. The printed paper emerges through a slot $j^{21}$ at the front of the machine where it can be torn off against a cutting edge $j^{22}$. The whole of the printing mechanism below the type quadrants may be mounted on a hinged portion $g^4$ of the base of the machine so that it can be swung down for the purpose of renewing the paper spool and the ribbon, etc.

In order to enable the total rollers to be brought to zero, the shafts $c^2$ and $c^5$ which carry them and the impulse and transfer wheels, are mounted so that the total rollers can be disengaged from the toothed quadrants $b$. For this purpose, the said shafts are mounted, at one end, in a bracket $k$ (Figure 9) which is pivoted at $k^1$ to one side of the frame of the machine so that the total rollers can be lifted free of their toothed quadrants by means of a handle $k^2$ protruding through the casing of the machine. The check pawls $c^8$, by means of which the impulse wheels $c^4$ are prevented from rotating backwards, are fixed on a rod $k^3$ which in turn is fixed to an arm $k^4$ pivoted at $k^5$ to the bracket $k$ and pulled inwards by a spring $k^6$ so as normally to keep the pawls in engagement with their impulse wheels, a stop pin $k^7$ being provided to limit the movement of the pawls. The ends of the said shaft, and rod remote from the bracket, are suitably mounted in a support (not shown) pivoted to the machine casing. The said arm is provided with an extension $k^8$ which also protrudes through the casing of the machine. Thus, when the total rollers are to be returned to zero, the handle $k^2$ is raised by moving it from the front to the rear of a gap $g^5$ in the casing, so as to free the rollers from the toothed quadrants, the extension $k^8$ being carried with it and temporarily held by a gap $g^6$ in the casing. The figure keys are then depressed to equal the total shown by the machine, the operating handle is operated so as to bring the front abutments $d^5$ on the racks into engagement with the depressed keys, the handle $k^2$ is released so as to re-mesh the total rollers with the toothed quadrants, the said extension handle $k^8$ being left behind, thus leaving the check pawls $c^8$ free of the impulse wheels, then the operating handle is returned so as to return the total rollers to zero, and finally the extension $k^8$ is returned so as to replace the check pawls, whereupon the machine is again ready for use.

I claim:

1. In a calculating machine, a registering device, a pivoted segment associated with said registering device and adapted when rocked to actuate said registering device, a fixed rack and a movable rack having their teeth in opposed relation, a pinion engaging with and rotatable between said racks and operative, when moved relatively to said fixed rack, to cause said movable rack to move twice the distance of the travel of said pinion, a row of keys associated with said movable rack, said keys being depressible to respectively limit the distance through which the movable rack may travel in one direction, means connecting said pinion and said segment to limit the rocking movement of said segment through an arc proportionate to the distance traversed by said movable rack, and means for rocking said segment.

2. In a calculating machine, a fixed rack, a rack longitudinally movable relatively to said fixed rack, a row of keys arranged above said fixed rack and selectively depressible to respectively limit the distance through which said movable rack may travel, a pinion engaging said fixed rack and said movable rack and operable, when moved along said fixed rack, to cause longitudinal movement of said movable rack twice the length of travel of said pinion on said fixed rack, a rotatable registering device having a toothed element, a segment having teeth engaging with those of the toothed element of the registering device, means for rocking said segment, and a link between said pinion and said segment to limit the movement of said segment in proportion to the distance through which said movable rack may travel.

In testimony whereof I have signed my name to this specification.

WILLIAM BALL.